US00RE36194E

United States Patent [19]

Tatsumi

[11] E Patent Number: Re. 36,194

[45] Reissued Date of Patent: Apr. 27, 1999

[54] MACHINE FOR FORMING SPIRAL GROOVES IN METAL PIPE INNER SURFACE

[75] Inventor: Aritaka Tatsumi, Ibaraki, Japan

[73] Assignee: Hitachi Cable, Ltd., Tokyo, Japan

[21] Appl. No.: 09/057,980

[22] Filed: Apr. 10, 1998

Related U.S. Patent Documents

Reissue of:

[64] Patent No.: 4,373,366
Issued: Feb. 15, 1983
Appl. No.: 06/218,152
Filed: Dec. 19, 1980

[30] Foreign Application Priority Data

Feb. 19, 1980 [JP] Japan ..... 55-19448

[51] Int. Cl.[6] ..... B21B 17/08

[52] U.S. Cl. ..... 72/75

[58] Field of Search ..... 72/68, 75, 77, 72/283, 370.01, 370.04

[56] References Cited

U.S. PATENT DOCUMENTS

| | | |
|---|---|---|
| 1,143,101 | 6/1915 | Brinkman . |
| 1,318,962 | 10/1919 | Brinkman . |
| 1,414,500 | 5/1922 | Brinkman . |
| 1,440,527 | 1/1923 | Brinkman . |
| 3,924,434 | 12/1975 | Fulier . |
| 4,306,437 | 12/1981 | Javorik et al. . |

FOREIGN PATENT DOCUMENTS

| | | |
|---|---|---|
| 1027355 | 5/1953 | France . |
| 54-37058 | 3/1979 | Japan . |
| 54-37059 | 3/1979 | Japan . |
| 55-103215 | 8/1980 | Japan . |
| 946407 | 1/1964 | United Kingdom . |
| 1093661 | 12/1967 | United Kingdom . |

*Primary Examiner*—Lewell A. Larson
*Attorney, Agent, or Firm*—Foley & Lardner

[57] ABSTRACT

An improved machine for forming a plurality of thin, spiral grooves in the inner surface of a metal pipe. A grooving plug is inserted and held in the metal pipe in such a manner that its axial position is constant and the metal pipe, while being moved longitudinally, is pressed by a plurality of balls which rotate planetarily around the outer surface of the metal pipe at a position corresponding to the position of the grooving plug to continuously form a plurality of spiral grooves in the inner surface of the metal pipe. Thereafter, the metal pipe is finished through a die. The machine manufactures at a high rate metal pipe which has a smooth outer surface and a grooved inner surface.

12 Claims, 3 Drawing Sheets

MACHINE FOR FORMING SPIRAL GROOVES IN METAL PIPE INNER SURFACE

Matter enclosed in heavy brackets [ ] appears in the original patent but forms no part of this reissue specification; matter printed in italics indicates the additions made by reissue.

BACKGROUND OF THE INVENTION

The present invention relates to an improved machine for forming thin, spiral grooves in the inner surface of a metal pipe.

The heat transmission pipes of an air conditioner, for instance, have inner surfaces which are grooved. In a conventional method of forming grooves in the inner surface of a metal pipe, a predetermined grooving plug is inserted and held in a metal pipe such as a copper pipe in such a manner that its axial position is constant. The metal pipe, while being moved in the axial direction, is pressed by a plurality of rolls which rotate planetarily around the part of the metal pipe where the grooving plug is positioned.

For implementation of this method, a machine for forming grooves in the inner surface of a metal pipe (hereinafter referred to merely as "a grooving machine" when applicable) can be readily constructed by combining an ordinary drawing machine with a draw bench, a bull block or a continuous drawing bench. However, in such a machine, when the metal pipe is moved, the stress caused in the metal pipe by friction between the metal pipe and the rolls is high and therefore the speed of processing the metal pipe may be limited because of the tensile strength of the metal pipe. Because of the limitation in processing speed, the application of this method to a metal pipe having a small wall thickness and small diameter is undesirable because the speed of processing such a metal pipe is unavoidably low.

SUMMARY OF THE INVENTION

Accordingly, an object of the invention is to provide a grooving machine which is so improved that the speed of forming grooves in the inner surface of a metal pipe is increased.

The foregoing object and other objects of the invention have been achieved by the provision of a grooving machine in which, instead of planetarily rotating rolls, a plurality of balls are employed as pressing members. The pressing members are so designed as to roll on the metal pipe and to thereby decrease the frictional resistance imparted to the metal pipe. The balls are made of a hard material.

The nature, principle and utility of the invention will become more apparent from the following detailed description and the appended claims when read in conjunction with the accompanying drawings.

DESCRIPTION OF THE PREFERRED EMBODIMENTS

Figure 1:
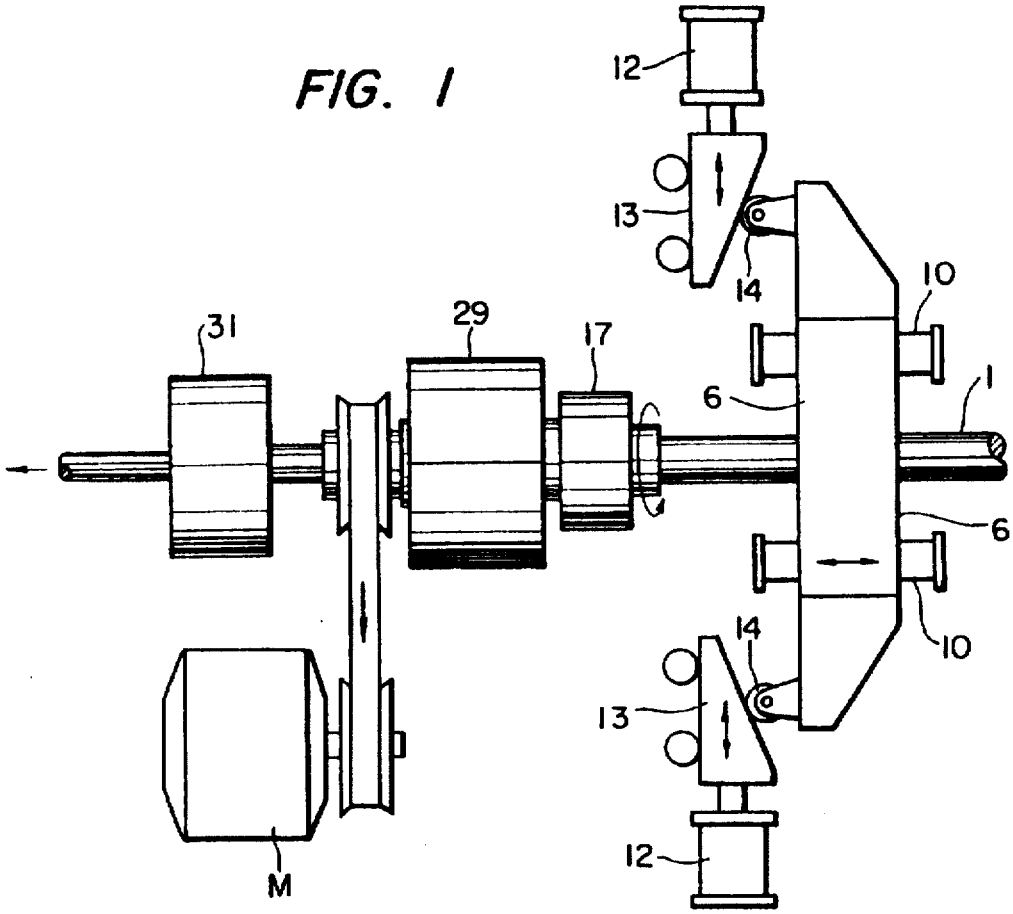
FIG. 1 is a plan view showing a first preferred embodiment of a grooving machine according to the invention.
Figure 2:
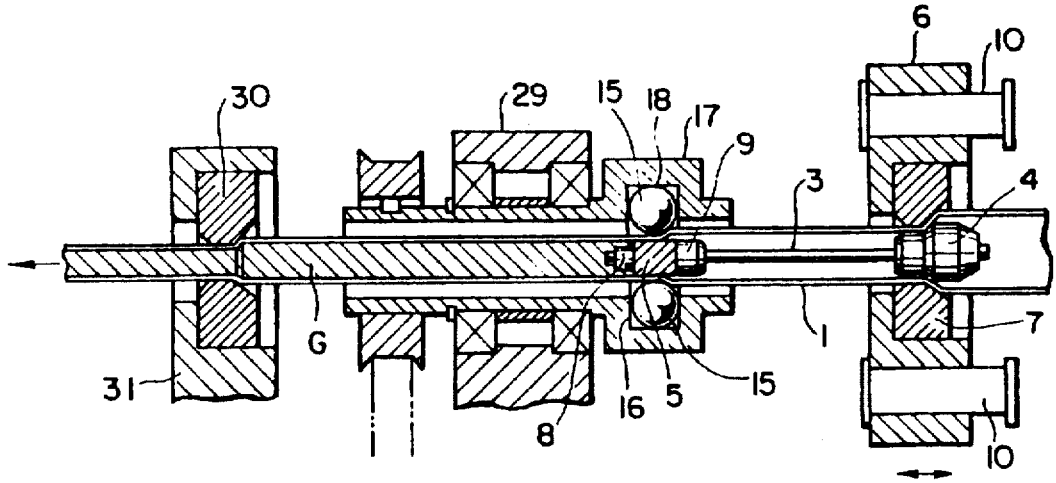
FIG. 2 is a sectional view showing essential components of the machine in FIG. 1.

A first embodiment of a machine for grooving the inner surface of a metal pipe constructed according to the invention, as shown in FIGS. 1 and 2, includes two dies 7 and 30 spaced apart from each other in the path of a metal pipe 1, a rotary head 17 disposed between the dies, and a tie rod 3 inserted into the metal pipe 1 which passes through the dies and the rotary head 17.

A grooving plug 5 having a plurality of predetermined spiral grooves on its outer surface is rotatably provided at the front end of the tie rod 3 and a floating plug 4 is fixedly secured to the rear end of the tie rod 3. A guide 8 whose outside diameter is slightly smaller than the inner diameter of grooves formed in the metal pipe 1 and a guide 9 whose outside diameter is substantially equal to that of the grooving plug 5 are provided respectively in front of and behind the grooving plug 5 at the front end of the tie rod 3 so as to protect the metal pipe from deformation and damage.

The floating plug 4 attached to the tie rod 3 is engaged with the die 7 through the metal pipe 1 so that the grooving plug 5 is held at a predetermined position in the rotary head 17. A holder 6 supporting the die 7 is movable along guides 10 in the axial direction of the metal pipe 1. The holder 6 is moved backwardly before the grooving operation is started. Then, the holder 6 is gradually moved forwardly to start the grooving operation stably.

The holder 6 is moved by bringing a roll 14 mounted on the holder 6 in contact with the sloping surfaces of wedges 13 which are moved back and forth by operation of hydraulic cylinders 12 as indicated in FIG. 1. The holder 6 may be driven directly by the hydraulic cylinder or it may be driven through a cam and a screw.

Figure 5:
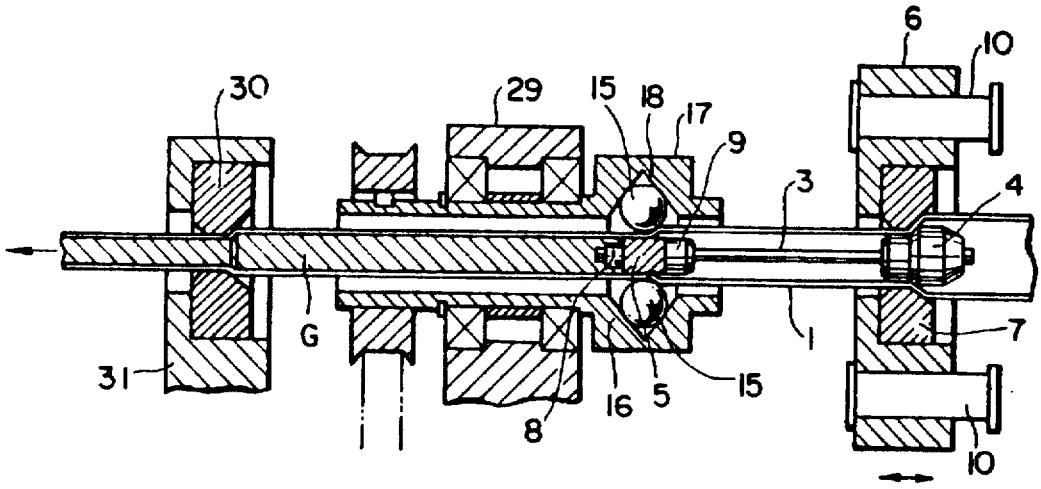
FIG. 5 is a sectional view identical to FIG. 2 except that a U-shaped groove is shown for accommodating a plurality of balls.

The rotary head 17 is supported by a bearing 29. A ring-shaped groove 16 is cut in the inner surface of the rotary head 17 and a plurality of (for instance six) balls 15 of equal diameter are disposed in the groove 16. The balls 15 may be inserted in the groove 16 immediately before the grooving operation starts although it is desirable that suitable holding means be used or the groove 16 be suitably configured so that the balls are maintained therein without the aid of the metal pipe 1. The groove 16 holding the balls 15 may be V-shaped in section as shown in FIG. 5.

While the head 17 is driven by an electric motor M through a power transmission mechanism made up of a belt, a chain, or the like as shown in FIG. 1, the balls 15 in the groove 16 revolve while rotating along both the rolling surface 18 of the head 17 and the outer wall of the metal pipe 1 to thereby reduce the diameter of the metal pipe 1 passing between the balls and to press the metal pipe 1 against the grooving plug 5 as a result of which grooves G are formed in the inner surface of the metal pipe 1. In this operation, the rotation of the balls 15 is in a direction determined by the direction and speed of rotation of the head 17 and by the direction and speed of movement of the metal pipe 1 relative to the head 17. In any case, the balls merely roll along the metal pipe. Accordingly, the frictional resistance exerted on the metal pipe is quite small which provides for a fast grooving speed.

In practice, heat is generated by the plastic deformation of the metal pipe 1 and by friction acting on various components. Therefore, it is necessary to apply, for instance, an emulsion type lubricant to the part being processed to lubricate and cool the part.

The speed of revolution of the balls is $D/(d_o+D)$ times the speed of rotation of the rotary head 17 where $d_o$ is the circle inscribed by the balls and D is the diameter of the rolling surface 18. The value of $D/(d_o+D)$ is smaller than one and therefore the speed of revolution of the balls with respect to the metal pipe 1 which effects grooving of the pipe 1 is lower by a factor of $D/(d_o+D)$ than the speed of rotation. In order to prevent this, a suitable stopper may be provided between the rotary head 17 and the balls 15 so that no positional displacement is caused. In this case, the balls 15 rotate while rolling with respect to the metal pipe and sliding with respect to the rotary head 17.

The operation of the grooving machine thus constructed will be described.

Before the grooving operation is started, a cylinder 12 is driven to move the grooving plug 5 backwardly through the holder 6. While the rotary head 17 is rotated, the cylinder 12 is driven to gradually move the grooving plug 5 forwardly to the predetermined position. Thus, the diameter of the metal pipe which has been reduced by the die 7 is further reduced when the pipe passes through the rotary head 17 while at the same time the metal pipe is pressed against the grooving plug 5 as a result of which thin continuous spiral grooves G are formed in the inner surface of the metal pipe. In this operation, continuous protruding spiral stripes are formed on the outer wall of the metal pipe due to the relation between the speed of rotation of the head 17 and the speed of movement of the metal pipe. The height (h) (not shown) of the protruding stripes is: $h=P^2/4d$, where P is the pitch of the rolling balls 15 and d is the outside diameter of each ball 15.

The pitch P of the balls 15 can be represented by the following expression: $P=V/N\ n$ where V is the speed of movement of the metal pipe relative of the rotary head 17, N is the number of balls, and n is the speed of rotation of the balls.

The speed n of rotation of the balls can be expressed as follows: $n=Dn_o/(D+d_o)$ where $n_o$ is the speed of rotation of the rotary head 17 and $d_o$ is the diameter of the inscribed circle of the balls.

Accordingly, if the factors d, D and N are set to constant values, and the speed of rotation of the rotary head 17 and the speed of movement of the metal pipe 1 are suitably selected, the protruding stripes may be formed to a desired size.

The protruding stripes are absorbed into the metal pipe as the pipe passes through the die 30 supported by a holder 31 and therefore cause no difficulties in the use of the pipe. Because of the absorption of the protruding stripes, the depth of the grooves G in the inner surface of the pipe and/or the height of protruding stripes forming the grooves G is varied at intervals in the longitudinal direction which contributes to an improvement of the thermal conductivity of the metal pipe.

In the grooving machine in FIG. 2, the axial force which is caused in association with the reduction of the diameter of the pipe is received by the rolling surface 18 of the groove 16 housing the balls 15. Therefore, even if a suitable lubricant is applied to the part being processed, the grooving plug, the balls and the rolling surface of the groove which are directly involved in the grooving operation are unavoidably worn. Accordingly, it is necessary to replace these parts from time to time in order to always manufacture products correct in sectional configuration.

Figure 3:
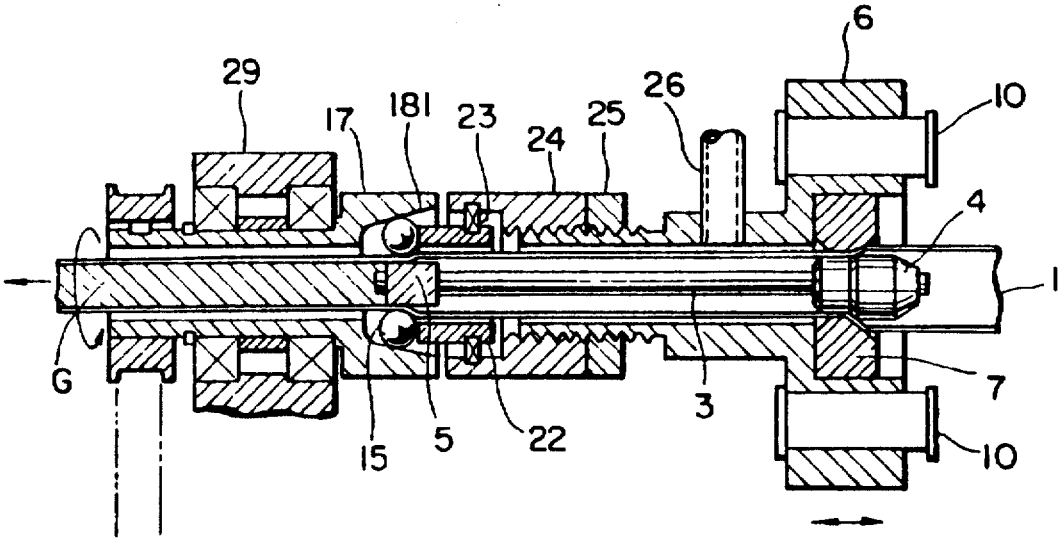
FIG. 3 is a sectional view showing essential components of a second embodiment of a grooving machine according to the invention.

FIG. 3 shows another embodiment of a grooving machine constructed according to the invention. In this embodiment, a component for receiving the balls 15 has a sloped rolling surface 181, and the balls 15 are supported by one end face of a push ring 22 which is arranged coaxially to prevent the shifting of the centers of the balls. The push ring 22 is mounted through a bearing 23 in an adjusting ring 24. With this configuration, the push ring 22 can transmit an axial force while rotating around the longitudinal axis of the pipe with the end face of the push ring 22 abutting against the balls 15.

The force of the push ring 22 pushing the balls 15 can be maintained as the metal pipe 1 is moved because the adjusting ring 24 is coupled to the die holder 6. The force of the push ring 22 can be readily controlled by adjusting the ring 24 because the ring 24 is screwed on the die holder 6.

In FIG. 3, reference numeral 25 designates a nut for fixedly positioning the rings 24 and 26 a hose or pipe for supporting the lubricant.

With this embodiment of the grooving apparatus of the invention, the sectional configuration and dimensions of the product can be finely adjusted with ease and with high accuracy by adjusting the adjusting ring 24 because the ring 24 is stationary as it is secured to the die holder 6. That is, in this case, as the ring 24 is adjusted, the push ring 22 is displaced to accurately vary the force pressing the balls 15.

In the embodiment of FIG. 3, axial movement of the push ring 22 is achieved by providing a force which pulls the pipe. However, this may be carried out by using a driving power operator different from that of the die holder 6.

Figure 4:
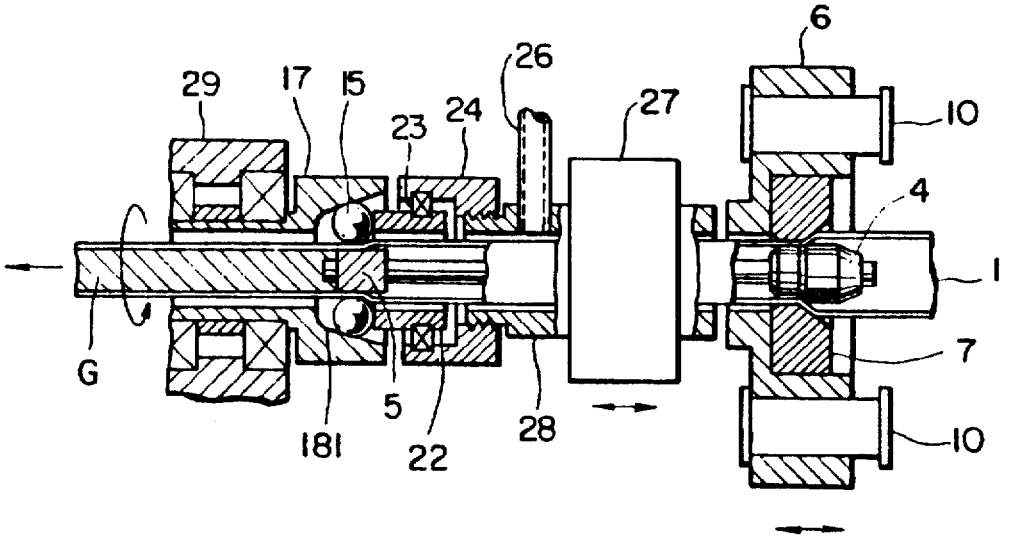
FIG. 4 is also a sectional view showing essential components of a third embodiment of a grooving machine according to the invention.

FIG. 4 shows another embodiment of a grooving machine according to the invention which implements the above-described method. In this case, the push ring 22 is coupled through the bearing 23 and the adjusting ring 24 to the hollow piston 28 of a hydraulic cylinder 27 which is secured at a predetermined position in the axial direction. The same effect can be obtained by moving the member abutted against the hollow piston with a cam, a screw or a link mechanism instead of the hydraulic cylinder 27.

In each of these embodiments, the bearing 23 serves to allow the push ring 22 to rotate in association with the rotation of the balls 15 to decrease the force applied to the balls 15, to decrease the force required to reduce the diameter of the pipe, and to minimize the wear of the balls 15. Therefore, any type of bearing may be used as the bearing 23 so long as its structure allows the push ring 22 to rotate freely while being subjected to a thrust force.

In all of the above-described embodiment, the relative position of the grooving plug and the balls is changed by moving the grooving plug although the same effect can be achieved by moving the balls.

As is apparent from the above description, according to the invention, the grooving machine is provided which is simple in construction and yet which is capable of a high speed of manufacturing metal pipes having grooves in their inner surfaces.

What is claimed is:

1. A machine for grooving an inner surface of a moving metal pipe comprising:

a tie rod insertable into said metal pipe;

a grooving plug rotatably mounted on a front end of said tie rod;

a floating plug fixedly secured to a rear end of said tie rod;

a rotary head;

a first die proposed at a position corresponding to a position of said floating plug, said first die being adapted to hold said grooving plug at a predetermined position in said rotary head;

said rotary head being disposed downstream of said first die;

a plurality of balls planetarily rotatably arranged in said rotary head to press a wall of said metal pipe against said grooving plug in said metal pipe so as to reduce a diameter of said metal pipe; and a second die arranged downstream of said rotary head, for finishing said metal pipe thus processed.

2. The machine as claimed in claim 1 further comprising means for moving said grooving plug relative to said balls in an axial direction of said metal pipe.

3. The machine as claimed in claim 2 further comprising means for moving said first die holding said grooving plug in an axial direction of said metal pipe.

4. The machine as claimed in claim 1 wherein said balls are equal in diameter and are received in a groove which is cut in said rotary head coaxially with a rotating axis of said rotary head;

and further comprising means for moving said first die holding said grooving plug in an axial direction of said metal pipe.

5. The machine as claimed in claim 4 in which said groove receiving said balls has a depth smaller than said diameter of each of said balls and is U-shaped in section.

6. The machine as claimed in claim 4 in which said groove receiving said balls is V-shaped in section.

7. The machine as claimed in claim 1 wherein said balls are received in a recess in said rotary head, a diameter of said recess decreasing gradually in a direction of movement of said metal pipe, and further comprising a push ring, said balls being supported by being pushed by one end face of said push ring from a side of a major diameter of said recess, said one end face of said push ring being perpendicular to an axial line of said push ring; a holder; and means for moving said first die holding said grooving plug in an axial direction of said metal pipe, said first die being supported by said holder.

8. The machine as claimed in claim 7 further comprising a bearing and an adjusting ring for coupling said push ring to said holder.

9. The machine as claimed in claim 7 further comprising a bearing, an adjusting ring, a cylinder, a hollow piston, and means for moving said hollow piston, said push ring being coupled through said bearing and said adjusting ring to said hollow piston.

10. The machine as claimed in claim 2 or 4 wherein said means for moving said grooving plug comprises a holder for supporting said first die, and a plurality of guides for guiding movement of said holder.

11. The machine as claimed in claim 3 or 7 wherein said means for moving said first die comprises a holder for supporting said first die and a plurality of guides for guiding movement of said holder.

12. The machine as claimed in claim 1 further comprising first and second guides disposed on said front end of said tie rod and on opposite sides of said grooving plug, said first guide having an outside diameter that is smaller than an inside diameter of grooves formed in said metal pipe, and said second guide having an outside diameter substantially equal to an outside diameter of said grooving plug.

* * * * *